Patented Feb. 7, 1950

2,496,978

UNITED STATES PATENT OFFICE 2,496,978

POLYTETRAFLUOROETHYLENE WAXES HAVING A SHARP MELTING POINT

Kenneth L. Berry, Hockessin, Del., assignor to E. I. du Pont de Nemours & Company, Wilmington, Del., a corporation of Delaware No Drawing. Application June 10, 1946, Serial No. 675,844

4 Claims. (Cl. 260—92.1)

This invention relates to synthetic waxes and more particularly to flurocarbon waxes and a method for their preparation.

It is an object of this invention to provide chemically inert waxes having exceptionally high melting points. It is a further object of this invention to provide new fluorocarbon waxes having improved properties. A still further object is to provide fluorocarbon waxes having sharp melting points and low melt viscosities. Another object is to provide a process for the preparation of new fluorocarbon waxes. Other objects will appear hereinafter.

These objects are accomplished by the following invention for preparation of a fluorocarbon wax which comprises heating polytetrafluoroethylene at a temperature of 450° to 500° C. for at least three hours and then discontinuing the heating before 40% of the polytetrafluoroethylene has been converted to volatile products. It has been discovered that fluorocarbon waxes having improved properties can be prepared by pyrolyzing polytetrafluoroethylene under the conditions defined above. The fluorocarbon waxes of this invention are microcrystalline solids showing on X-ray diffraction the characteristic pattern of a microcrystalline structure and melting sharply in the range of 320° to 327° C. to clear, mobile liquids, having low melt viscosities. These waxes are normally hard, friable solids having the same chemical inertness and insolubility characteristics as the polytetrafluoroethylene from which they are made and also having a high degree of water repellency.

The friability of the wax can be decreased and the toughness of castings thereof improved by incorporating various modifying agents. For example, the incorporation of as little as two parts by weight of glass fibers in 100 parts of the microcrystalline wax decreases the friability and increases the toughness considerably. The incorporation of 5% of an interpolymer of 60 parts (by weight) of tetrafluoroethylene and 40 parts of chlorotrifluoroethylene produces a tougher and harder wax having less tendency to crack on freezing than the unmodified wax.

Starting materials suitable for the preparation of the microcrystalline fluorocarbon waxes of invention include any of the solid polymers of tetrafluoroethylene prepared by conventional polymerization methods. For example, suitable starting materials can be prepared by polymerizing tetrafluoroethylene in the presence of water, or in the presence of water and oxygen or an organic peroxy compound, at ordinary or elevated temperatures and at pressures in excess of atmospheric as described in U. S. Patents 2,393,967, issued February 5, 1946, and 2,394,243, issued February 5, 1946.

In preparing the fluorocarbon waxes of this invention, heating period of 3 to 20 hours are usually sufficient. In general, the longer times are necessary when the wax is produced at the lower temperatures within the range of 450° to 500° C. The length of heating also depends on the particular melt viscosity desired in the microcrystalline wax. At any given temperature of pyrolysis, products of lower melt viscosity are obtained with longer periods of heating. However, the heating should be discontinued prior to conversion of 40% of the polytetrafluoroethylene to volatile products.

The pyrolysis of the polytetrafluoroethylene can be carried out in reaction vessels made of any material of construction which is resistant to the ingredients and reaction products under the conditions of pyrolysis. As indicated by the following examples, nickel is a suitable material of construction. However, other corrosion-resistant materials, such as stainless steel or various nickel alloys, can be used if desired.

The pyrolysis can be conducted in the presence of the air normally present above the surface of the polymer in the reaction vessel. It is not necessary to blanket the polymer with an inert gas as is necessary in some other types of pyrolysis reactions.

The invention is further illustrated by the following examples in which the proportions of the ingredients are expressed in parts by weight, unless otherwise stated.

Example I

Twenty-seven (27) parts of film-forming polytetrafluoroethylene is heated for 3.5 hours at 500° C. in a nickel vessel which bears a loosely fitting cover. In the early stages of the pyrolysis, the polymer is a transparent, rubbery, non-flowing mass filled with bubbles of gas. As the heating is continued gaseous products are evolved and the charge gradually becomes a highly fluid, nearly water-clear melt. Upon cooling below 327° C., the molten product solidifies rather abruptly to a hard friable wax. There is obtained a yield of 20.5 parts of wax, corresponding to 76% of the starting material, having the same chemical inertness and insolubility characteristics as the polymer from which it is made, but differing in that it melts sharply in the range 320°–327° C. to a clear, mobile liquid. An X-ray diffraction pattern of the wax contains 12 concentric diffraction rings, which indicates that the wax possesses a well-defined microcrystalline structure. It also has a high degree of water repellency, drops of water rolling off the surface of the wax without wetting it.

Example II

Four hundred (400) parts of film-forming polytetrafluoroethylene is heated for 15 hours at 475° C. in a loosely covered nickel vessel. There is obtained 325 parts (corresponding to an 81% yield based on the original polymer) of tetrafluoroethylene wax. This wax melts sharply at 327° C. and has a melt viscosity somewhat lower than that of the wax of Example I.

The outstanding water repellency of the products of this invention is illustrated by the following test, which is carried out by a procedure similar to that described by McDougall and Ockrent in Proc. Roy. Soc. (London) 180A 151–73 (1942).

A film of uniform thickness of the microcrystalline tetrafluoroethylene wax of this invention is cast on a ground glass plate and allowed to harden. The plate with the attached film is then inclined at an angle of 10° with the horizontal and a single drop of water placed on its surface. The drop of water tends to move down the sloping surface and this results in the drop of water forming different angles between the surface of the wax and the surface of the drop at its points of contact on its upper and lower sides. These angles are measured, and the angle between the lower side of the drop and the film of wax is called the advancing angle, and the angle between the upper side of the drop and the surface of the wax is termed the receding angle. The receding and advancing angles for a drop of water placed on a film of microcrystalline tetrafluoroethylene wax of this invention are 127° and 123°, respectively. The corresponding angles for a drop of water placed on a film of Asiatic paraffin wax are 115° and 106°, respectively. Since materials having the greater receding and advancing angles in this test are more water-repellent, it is evident that the water-repellency of the fluorocarbon wax of this invention is superior to the standard Asiatic paraffin wax in this respect.

The use of the microcrystalline waxes of this invention as impregnants and coatings for porous ceramic articles is illustrated as follows:

A porous ceramic insulator is heated above 327° C. and the wax of Example I, previously reduced to fine particle size by grinding, is sifted onto the insulator. The wax melts and is partially imbibed by the ceramic. Upon cooling, the insulator is found to have a smooth, tightly adherent, waxy coating from which water flows without wetting. This water repellency is not altered by rubbing the coating of wax with the fingers, by heating, or by treating the surface with organic liquids such as alcohol, acetone, lubricating oils or esters of phthalic acid.

Because of their non-flammability and their low melt viscosity, the waxes of this invention can also be applied to various substances as a coating by means of the flame spraying technique. By way of illustration, the powdered microcrystalline tetrafluoroethylene wax is gradually fed into a flame which is directed against the surface of the article to be coated. The heat of the flame melts the wax and the molten drops are sprayed onto the surface of the article being coated whereupon the wax flows sufficiently to form a uniform coating.

The hard microcrystalline waxes of this invention are of particular value as impregnants and coatings for ceramics, porous carbon articles, and metal articles because of their ease of application from the molten state and because of their unique combination of good chemical, electrical and water repellent properties. For example, these waxes are not affected by organic solvents, corrosive acids such as sulfuric, hydrochloric, hydrofluoric, chlorosulfonic, nitric or aqua regia, corrosive gases such as chlorine, ozone, and nitrogen oxides, alkalies, including fused caustic (eutectic mixture of sodium and potassium hydroxides) at 300° C., or by heating in air at temperatures as high as 300° C. Their electrical properties include low power factor and excellent insulation resistance.

Because of their microcrystalline character, these fluorocarbon waxes form relatively hard, tough coatings on various substrates. This property, in combination with their chemical inertness, makes these waxes unique as protective coating and impregnant materials. These waxes are also useful as a medium in which to imbed electric coils.

As many apparently widely different embodiments of this invention may be made without departing from the spirit and scope thereof, it is to be understood that I do not limit myself to the specific embodiments thereof except as defined in the appended claims.

I claim:

1. A process for the preparation of a polytetrafluoroethylene wax having a sharp melting point between 320° and 327° C. which comprises heating polytetrafluoroethylene at a temperature of 450° to 500° C. for a period of at least three hours and until the polytetrafluoroethylene becomes a fluid melt, removing evolved gaseous products therefrom and discontinuing said heating before more than 40% of said polytetrafluoroethylene has been converted to volatile products, then cooling the molten polytetrafluoroethylene below 320 C., thereby solidifying said polytetrafluoroethylene to a hard, friable wax having a sharp melting point as aforesaid.

2. A normally hard, friable polytetrafluoroethylene wax comprising essentially and as the sole fluorocarbon ingredient pyrolyzed tetrafluoroethylene polymers showing on X-ray diffraction the characteristic pattern of a microcrystalline structure and having a sharp melting point between 320° and 327° C.

3. A normally hard, friable polytetrafluoroethylene wax consisting of pyrolyzed tetrafluoroethylene polymers showing on X-ray diffraction the characteristic pattern of a microcrystalline structure and having a sharp melting point between 320° and 327° C.

4. A normally porous ceramic article containing a water-repellent coating consisting of a normally hard, friable polytetrafluoroethylene wax comprising essentially and as the sole fluorocarbon ingredient pyrolyzed tetrafluoroethylene polymers showing on X-ray diffraction the characteristic pattern of a microcrystalline structure and having a sharp melting point between 320° and 327° C.

KENNETH L. BERRY.

REFERENCES CITED

The following references are of record in the file of this patent:

UNITED STATES PATENTS

| Number | Name | Date |
|---|---|---|
| 2,392,389 | Joyce | Jan. 8, 1946 |
| 2,394,581 | Benning | Feb. 12, 1946 |
| 2,400,099 | Brubaker | May 14, 1946 |
| 2,406,153 | Lewis | Aug. 20, 1946 |